(12) United States Patent
Pomichter, Jr.

(10) Patent No.: US 7,577,231 B2
(45) Date of Patent: Aug. 18, 2009

(54) CLOCK MULTIPLIER STRUCTURE FOR FIXED SPEED TESTING OF INTEGRATED CIRCUITS

(75) Inventor: Gerald P. Pomichter, Jr., Fairfax, VT (US)

(73) Assignee: International Business Machines Corporation, Armonk, NY (US)

( * ) Notice: Subject to any disclaimer, the term of this patent is extended or adjusted under 35 U.S.C. 154(b) by 80 days.

(21) Appl. No.: 11/687,291

(22) Filed: Mar. 16, 2007

(65) Prior Publication Data
US 2008/0224742 A1 Sep. 18, 2008

(51) Int. Cl.
*H03K 21/00* (2006.01)
(52) U.S. Cl. .......................... 377/47; 327/116
(58) Field of Classification Search .......... None
See application file for complete search history.

(56) References Cited

U.S. PATENT DOCUMENTS

| | | | |
|---|---|---|---|
| 6,265,916 B1 * | 7/2001 | Ono et al. .................. 327/116 |
| 6,445,232 B1 | 9/2002 | Logue et al. |
| 6,509,766 B1 | 1/2003 | Pomichter et al. |
| 6,756,827 B2 * | 6/2004 | Konuk et al. ............. 327/116 |
| 6,876,236 B2 * | 4/2005 | Aman ....................... 327/121 |
| 6,906,562 B1 | 6/2005 | Nguyen |
| 7,002,415 B2 | 2/2006 | Tsyrganovich |
| 7,093,177 B2 | 8/2006 | West et al. |
| 7,130,230 B2 | 10/2006 | Jain et al. |
| 7,139,361 B1 | 11/2006 | Nguyen |
| 7,236,557 B1 * | 6/2007 | Nguyen ...................... 377/47 |

* cited by examiner

*Primary Examiner*—Cassandra Cox
(74) *Attorney, Agent, or Firm*—Downs Rachlin Martin PLLC

(57) ABSTRACT

An on-chip clock multiplier for outputting a fast clock that is approximately a predetermined multiple n of a slow clock. The multiplier utilizing a high-speed oscillator to generate a high-frequency base signal. A lower frequency signal is generated using the high-frequency base signal as a function of the output of a rollover counter that counts from a seed value to a terminal value. A saturation counter is used to determine whether no more than n pulses of the lower frequency signal occur within a single cycle of the slow clock. If not, the lower frequency signal is iteratively slowed by changing the seed value until no more than n pulses of the lower frequency signal occur within a single cycle of the slow clock. When this iteration is done, the fast clock having a frequency that is approximately n times the frequency of the slow clock is output.

18 Claims, 3 Drawing Sheets

CLOCK MULTIPLIER STRUCTURE FOR FIXED SPEED TESTING OF INTEGRATED CIRCUITS

FIELD OF THE DISCLOSURE

The present disclosure generally relates to the field of clock generator circuits. In particular, the present disclosure is directed to a small scale clock multiplier circuit for fixed speed testing.

BACKGROUND

Integrated circuits are subjected to various sorts of tests depending on the capabilities and requirements of the device under test. One such test is a "burn-in" test, which is the process of exercising an integrated circuit at elevated voltage and temperature in attempt to cause the circuit to quickly fail under high-stress conditions if particular defects are present in the device. Dynamic random access memory (DRAM) circuits and devices are frequently subject to burn-in testing. As memory speeds become higher with successive generations of technology, the ability to cost-effectively test these high-speed memories is becoming more difficult due to, for example, the need for high-speed test clocks to properly exercise the memory during burn-in. For example, in the case of a DRAM that has a retention time on the order of 5.0 microseconds ($\mu s$) at 140° C., the ability to effectively test the DRAM in a burn-in environment is controlled by the retention time of the DRAM cells. For example, in trying to test a single bank (e.g., 256 rows) of DRAM with a 300 ns tester cycle, a row (e.g., out of 256 in a bank) needs to be refreshed about every 20 ns in order to keep a single bank alive for a functional test. This means that the test clock must have a frequency of at least 50 MHz. Typical external tester clocks have frequencies more on the order of less than 1 MHz.

An alternative to increasing the clock speeds of external testers is to provide each device under test with an internal phase-locked loop (PLL). However, internal PLLs require a relatively significant amount of space on a chip, have relatively high power requirements, and have no means for efficiently dealing with very long tester cycles since it will generally require a delay mechanism that would clone the tester cycle and require unique devices, such as resistors, capacitors, low leakage and high threshold devices.

SUMMARY OF THE DISCLOSURE

In one embodiment a clock multiplier structure for fixed speed testing of integrated circuits is provided. The structure includes a clock signal generator for generating an output clock signal having a plurality of first oscillation cycles, the clock signal generator including: a ring oscillator signal having a first frequency and a plurality of second oscillation cycles; a rollover counter in electrical communication with the ring oscillator for counting ones of the plurality of second oscillation cycles of the ring oscillator from a seed value to a terminal value and outputting a pulse each time the rollover counter reaches the first terminal value; a saturation counter in electrical communication with the clock signal generator for counting ones of the plurality of second oscillation cycles from a multiplier start value to a saturation value and outputting a binary signal indicating whether or not the saturation counter has reached the saturation value, the saturation counter for receiving an input clock signal and configured to reset as a function of the input clock signal; and a seed value generator in electrical communication with the saturation counter, the seed value generator for generating the seed value when the binary signal indicates that the saturation has not reached the saturation value, the seed value generator in electrical communication with the rollover counter for providing the seed value to the rollover generator.

In another embodiment, an integrated circuit is provided. The integrated circuit includes functional circuitry; a clock multiplier in electrical communication with the functional circuitry so as to provide a first clock signal having a plurality of first oscillation cycles to the functional circuitry, the clock multiplier including: a clock signal generator for generating the first clock signal and including: a ring oscillator for generating an oscillator signal having a first frequency and a plurality of second oscillation cycles; a rollover counter in electrical communication with the ring oscillator for counting ones of the plurality of second oscillation cycles of the ring oscillation from a seed value to a terminal value and outputting a pulse each time the rollover counter reaches the first terminal value; a saturation counter in electrical communication with the clock signal generator for counting ones of the plurality of second oscillation cycles from a multiplier start value to a saturation value and outputting a binary signal indicating whether or not the saturation counter has reached the saturation value, the saturation counter having a clock input for receiving a second clock signal and configured to reset as a function of the second clock signal; and a seed value generator in electrical communication with the saturation counter, the seed value generator for generating the seed value when the binary signal indicates that the saturation has not reached the saturation value, the seed value generator in electrical communication with the rollover counter for providing the seed value to the rollover generator.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
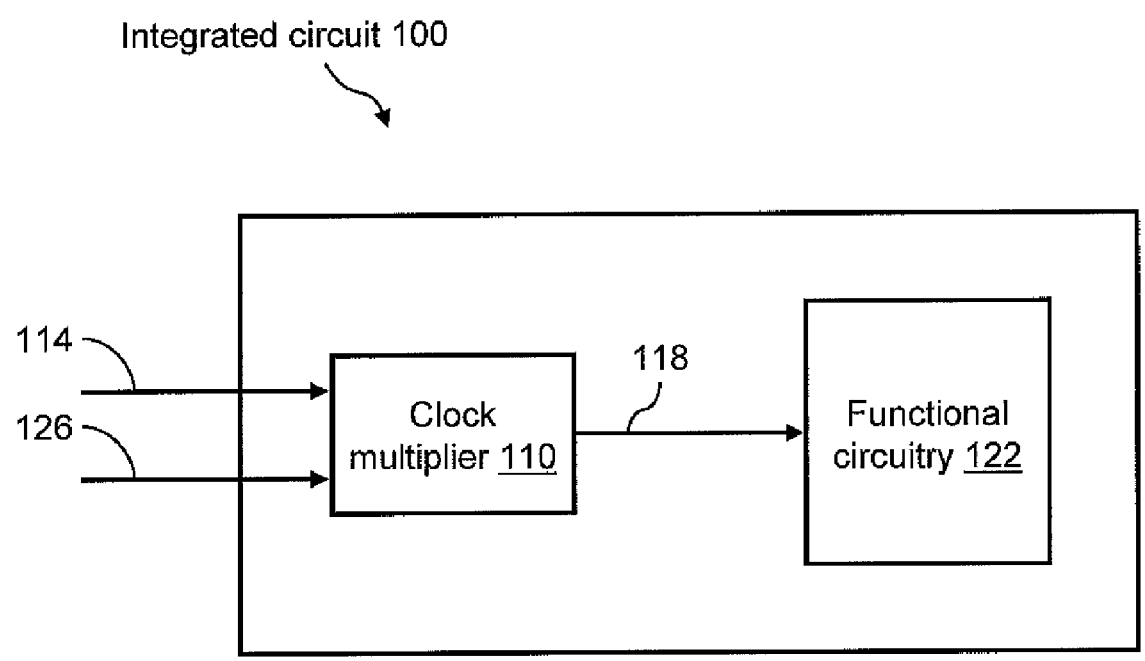
FIG. 1 illustrates a block diagram of an exemplary integrated circuit that includes a clock multiplier for generating a fast clock from a slow clock.

FIG. 1 illustrates an integrated circuit 100 that includes a clock multiplier 110 for generating a fast clock from a slow clock. Clock multiplier 110 is fed by an input clock signal to be multiplied, such as test clock signal 114, and provides an output clock signal 118 having a frequency greater than the frequency of test clock signal 114 by a certain predetermined multiple, which may be fixed or programmable. Output clock signal 118 may be provided to functional circuitry 122, which may be any suitable functional circuitry, such as one or more dynamic random access memories (DRAMs), SRAMS, Memory BISTs, application specific circuits, etc.

In two examples, the multiplier is 32 and 8, respectively. The first example may be pertinent, for example, to a burn-in test that requires the output clock signal 118 to have a period no greater than 20 ns but where the test cycle time is about 300 ns, i.e., the frequency of test clock signal 114 is about 333 kHz. Such a burn-in test could be, for example, for the DRAM mentioned in the Background section above. In this case, a frequency multiplier (which conversely translates into a period divider) of 32 results in test clock signal 114 being multiplied by 32 so as to make the frequency of output clock signal 118 about 107 MHz, which gives a period of about 10 ns that is less than the 20 ns maximum desired. The second example may be pertinent to a long parallel select test (LPST) in which test clock signal 114 has a period of 100 ns, but it is desired that the period of output clock signal 118 be no greater than 20 ns. In this case, the frequency multiplier (period divider) need only be 8, since 100 ns/8=12 ns, which is less than the 20 ns maximum desired.

Clock multiplier 110 may be controlled by one or more control signal 126. For example, control signal 126 may include, but is not limited to, a system reset signal, an enable signal, select signals for setting the multiplication factor of clock multiplier 110, select signals for setting the delay of clock multiplier 110, and any combinations thereof. An example 200 of a clock multiplier suitable for use as clock multiplier 110 is described below in connection with FIGS. 2 and 3.

Figure 2:
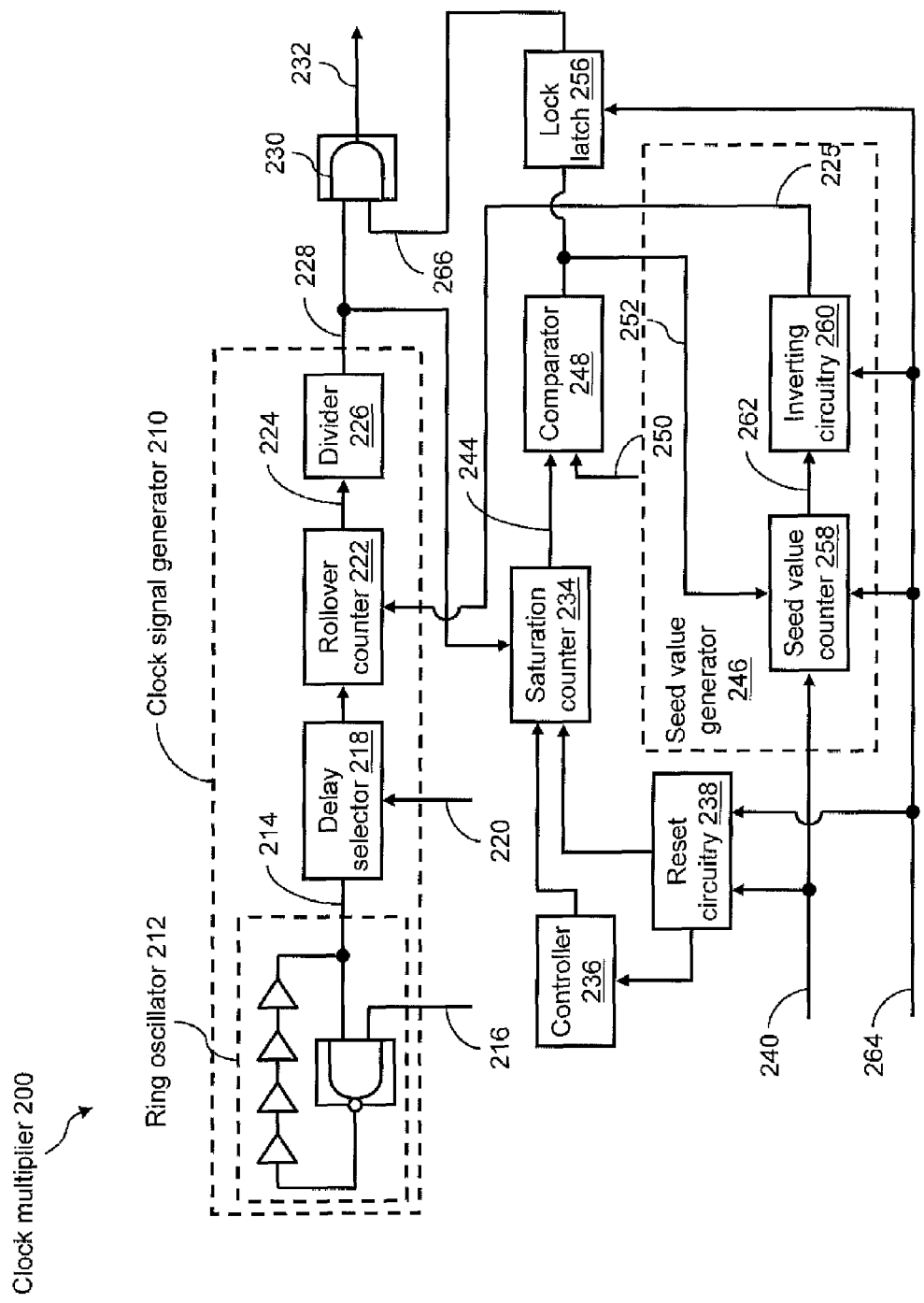
FIG. 2 illustrates a block diagram of an exemplary clock multiplier that is suitable for use as the clock multiplier of FIG. 1.

Referring now to FIG. 2, this figure illustrates clock multiplier 200 as including a clock signal generator 210, for example, a high speed oscillator whose frequency may be significantly greater than the frequency of the clock of interest (e.g., test clock 114 of FIG. 1) to be multiplied. Clock signal generator 210 may include a ring oscillator 212 that generates a free-running high frequency oscillator signal 214. Ring oscillator 212 may be any simple oscillator circuit, such as, but not limited to, an inverter chain that is gated by an enable signal 216, as shown in FIG. 2. Oscillator signal 214 of ring oscillator 212 may be optionally provided to a programmable delay selector 218 that provides a user-selected range of delay via program selects 220. In one example, delay selector 218 may provide a delay range from about 0.2 ns to about 0.5 ns. Oscillator signal 214 of ring oscillator 212, which may be delayed via delay selector 218 as just described, is provided to a rollover counter 222. The frequency range of oscillator signal 214 of ring oscillator 212 may be, for example, but not limited to, from about 2 GHz to about 5 GHz. Whatever frequency is implemented, care must be taken so that the frequency of the signal provided to rollover counter 222, i.e., either the raw or delayed oscillator signal 214, does not exceed the maximum allowable frequency of the rollover counter.

Rollover counter 222 may be, for example, a binary incrementing counter, a binary decrementing counter, or a linear feedback shift register (LFSR) acting as a counter, among others, that is clocked continuously by oscillator signal 214 of ring oscillator 212. The bit width of rollover counter 222 may be designer-defined. Rollover counter 222 starts counting from a seed value 225 (discussed in more detail below) to an terminal value. When the terminal value is reached, rollover counter 222 generates a terminal value pulse and wraps around to its seed value and the count sequence is repeated so as to output a stream 224 of terminal value pulses having a frequency that depends on the seed value of rollover counter 222. Stream 224 may optionally feed a frequency divider 226. In one example, frequency divider 226 may be a divider-by-2 circuit formed via a toggle latch that is clocked by stream 224 of terminal value pulses. Frequency divider 226, if provided, generates an output clock signal 228 of clock signal generator 210. Otherwise, output clock signal 228 is stream 224 of the terminal pulses of rollover counter 222. Output clock signal 228 of clock signal generator 210 may be gated by, for example, but not limited to, an AND gate 230, which supplies gated output clock signal 232 to functional circuitry within an integrated circuit, such as functional circuitry 122 of integrated circuit 100 of FIG. 1.

Output clock signal 228 of clock signal generator 210 feeds an input of a saturation counter 234, which may be, for example, a binary incrementing counter, a binary decrementing counter, or an LFSR acting as a counter that is clocked by output clock signal 228 of clock signal generator 210, among others. The bit width of saturation counter 234 may be designer-defined. Saturation counter 234 starts counting from an initial value and counts toward a saturation value. In one example, the initial value is equal to the saturation value minus a multiplier as discussed below in more detail.

Saturation counter 234 is controlled by reset circuitry 238 to reset each clock cycle of a clock signal of interest to be multiplied, here clock signal 240 that corresponds to test clock signal 114 of FIG. 1. Saturation counter 234 outputs a counter status signal 244 that indicates whether or not the saturation counter has saturated. For example, saturation counter 234 may simply output the most significant bit of the counter. In this case, saturation counter 234 would output a logic "0" on counter status signal 244 indicating that it has not saturated and, conversely, would output a logic "1" on the counter status signal indicating that it has saturated, i.e., reached its saturation value. As will become apparent from the description below, the function of saturation counter 234 is to determine whether or not it saturates within a clock cycle of clock signal 240. This allows clock multiplier 200 to determine whether or not the seed value of rollover counter 222 is the proper value. Optionally, the multiplier used by saturation counter 234 may be programmable via a controller 236.

Counter status signal 244 is provided to a comparator 248 that compares the counter status signal to predetermined value at the end of each cycle of clock signal so as to determine whether or not saturation counter 234 saturated or not during that cycle. The predetermined value may be input via an input signal 250. For example, if saturation counter 234 outputs a logic "1" on counter status signal 244 upon saturation, comparator 248 may compare the saturation signal to a logic "1." A match, of course, indicates that saturation counter 234 has saturated during the clock cycle. This means that the seed value of rollover counter 222 is too high and must be decremented to slow down output clock signal 228 (recall that the rollover counter counts from the seed value to a terminal value, so the lower the seed value, the longer the rollover counter counts and the slower the frequency of output clock signal 228). A non-match, i.e., counter status signal 244 is a logic "0," at the end of the cycle of clock signal 240 indicates that saturation counter has not saturated (here, the seed value is not too high and output clock signal 228 can be locked).

Comparator 248 may output a binary control signal 252 in each of a seed value generator 246 and a lock latch 256. Seed value generator 246 may be responsive to binary signal 252 indicating that saturation counter 234 has saturated by decrementing seed value 225 used by rollover counter 222 as described above. Seed value generator 246 may accomplish this decrementing of seed value 225, e.g., using an incrementing seed value counter 258 and inverting circuitry 260 that inverts the output 262 of the seed value counter. Although seed value counter 258 is noted here as being an incrementing counter, those skilled in the art will readily appreciate that in other embodiments the seed value counter may be, for example, a binary decrementing counter or a LFSR acting as a counter that counts in response to clock signal 240 only when binary control signal 252 is indicating that saturation of saturation counter 234 has occurred. In the case of a decrementing counter, seed value generator 246 need not have inverting circuitry 260. The bit width of seed value counter 258 may be designer-defined.

Each time that saturation counter 234 reaches saturation before the next cycle of clock signal 240, which resets saturation counter 234, seed value 225 that is provided to rollover counter 222 via seed value counter 258 is updated. Each unique seed value 225 that feeds rollover counter 222 corresponds to a unique frequency of output clock signal 228 of clock signal generator 210. Once seed value 225 has reached a level low enough that saturation counter 234 does not saturate within a cycle of clock signal 240, the corresponding binary value of binary control signal 252 activates lock latch 256 so that AND gate 230 enables gated output clock signal 232.

The operation of clock multiplier 200 in one example scenario is as follows. In this example, rollover counter 222, saturation counter 234, and seed value counter 258 are each 5-bit binary incrementing counters, which without predetermined starting values count 32 pulses (0 to 31, inclusive). Consequently, rollover counter 222 counts from (32 minus seed value 225) up to 32, saturation counter 234 counts from (32 minus the multiplier) up to 32 and saturates at 32 pulses and seed value counter 258 may provide a seed value from a 0 to 31. Additionally, in this example inverting circuitry 260 may be formed of a set of inverters for inverting the 5-bit output 262 of seed value counter 258 so as to provide the proper seed value 225 to rollover counter 222.

In a circuit initialization operation, enable signal 216 is not active and a system reset signal 264 may be issued in order to precondition elements of clock multiplier 200 to known states. In particular, output 262 of seed value counter 258 is preconditioned such that, when inverted, seed value 225 of rollover counter 222 is the terminal value of the rollover counter (here, 32) minus 1, or 31, which corresponds to stream 224 of terminal value pulses of the rollover counter running at its highest possible frequency. Additionally, saturation counter 234 is preconditioned to start at the saturation value of the saturation counter (here, 32) minus a multiplier, and lock latch 256 is reset.

After completing the initialization operation, enable signal 216 is activated and a first frequency calibration sequence begins. Because rollover counter 222 is seeded to its terminal value minus 1 and thus outputs a terminal value pulse on every count, saturation counter 234 is counting at its highest possible frequency in the context of clock multiplier 200. By way of example, saturation counter 234 reaches saturation and stops counting before the next occurrence of clock signal 240 and, thus, binary signal 252 of comparator 248 is active, which enables seed value counter 258.

Consequently, if saturation counter 234 saturates, i.e., counts from (saturation value minus the multiplier) to 32 within one cycle of clock signal 240, on the next cycle of clock signal 240, seed value counter 258 increments, in effect decrementing seed value 225 to the terminal value of rollover counter 222 minus 2 (32−2=30), which cuts in half the frequency of stream 224 of terminal values pulses output by the rollover counter relative to the initial seed value of 31. Also, on the next occurrence of a full cycle of clock signal 240, saturation counter 234 is reset and counts this time as a function of the slower stream 224. By way of example, if saturation counter 234 again saturates within a particular cycle of clock signal 240, binary control signal 252 of comparator 248 will again enable seed value generator 246 to decrement seed value 225, this time to 32−3=29. Consequently, the frequency of stream 224 becomes one-third of its initial value when seed value was 31.

The iterative process of decrementing seed value 225, determining that saturation counter 234 saturates within a cycle of clock signal 240 and re-decrementing seed value 225 continues until the frequency of output clock signal 228 is sufficiently slow that saturation counter 234 does not have sufficient time to reach saturation within a cycle of clock signal 240. At such time, output clock signal 228 is equal to about the frequency of clock signal 240 multiplied by the multiplier used in saturation counter 234, and seed value generator 246 is held at a fixed value because binary control signal 252 of comparator 248 is not active and, thus, seed value counter 258 is not allowed to increment. Additionally, lock latch 256 is set, which indicates that a lock condition has been reached. As a result, gated output clock signal 232 is enabled via AND gate 230 and provided to functional circuitry of an integrated circuit, for example, functional circuitry 122 of integrated circuit 100 of FIG. 1. A set 300 of example timing diagrams of clock multiplier 200 are illustrated in FIG. 3.

Figure 3:
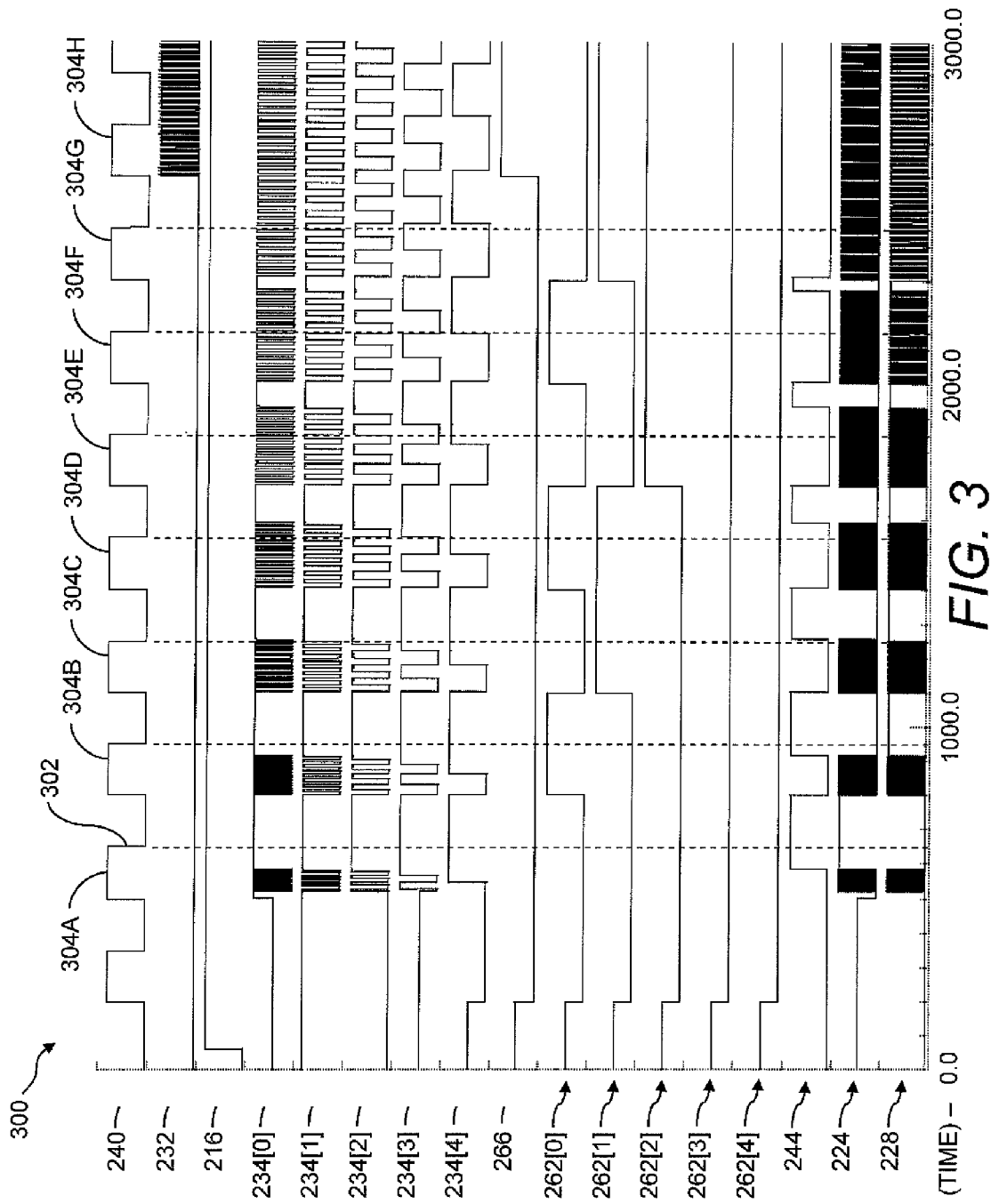
FIG. 3 illustrates an exemplary set of timing diagrams that illustrate the operation of the exemplary clock multiplier of FIG. 2.

Referring now to FIG. 3 and also to FIG. 2, FIG. 3 contains an example set 300 of timing diagrams that illustrate the operation of clock multiplier 200 (FIG. 2) that includes, for example, a 5-bit rollover counter 222, a 5-bit saturation counter 234, and a 5-bit seed value counter 258 similar to the example just described. In particular, timing diagrams 300 show waveforms for test clock signal 240, gated output clock signal 232, enable signal 216, five bits of saturation counter 234 (designated 234[0], 234[1], 234[2], 234[3], 234[4], respectively), a lock signal 266 as would be issued by lock latch 256 to AND gate 230, five bits of output 262 of seed value counter (designated 262[0], 262[1], 262[2], 262[3], 262[4], respectively), counter status signal 244, stream 224 of output pulses of rollover counter 222 and output clock signal 228 output by divider 226.

Regarding bits 234[0] to 234[4], it should be recognized that bit 234[4] is the most significant bit of saturation counter 234 that, as described above, essentially controls the operations of seed value generator 246 and lock latch 256. When most significant bit 234[4] is high in a count within a single cycle of clock signal 240, saturation counter 234 is saturated and, consequently, saturation counter 234 causes counter status signal 244 to go high, which in turn causes binary control signal 252 of comparator 248 to also go high, thereby enabling seed value generator 246 to decrement seed value 225 (by incrementing output signal 262 of seed value counter 258 (see bit signals 262[4] of FIG. 3) so as to decrease the frequency of output clock signal 228. Conversely, when most significant bit 234[4] is low in a count within a single cycle of clock signal 240, saturation counter 234 has not saturated (so counter status signal 244 does not go high) and the resulting low binary control signal 252 causes lock latch 256 to issue lock signal 266 so as to enable gated output clock signal 232. It is noted that in this example, the multiplier is 32, so that saturation counter 234 counts the full 32 pulses of output clock signal 228, i.e., from (32−32=0) to 32.

As seen by the waveform of enable signal 216, after clock multiplier 200 is enabled, the feedback process of determining the first time that saturation counter 234 does not saturate within a corresponding respective cycle of clock signal 240 begins. At first, output clock signal 228 is cycling very fast in response to seed value being 31. Consequently, rollover counter 222 rolls over every time the rollover counter counts from 31 to 32. (It is noted that in this example, divider 224 divides the frequency of stream 224 of rollover pulses by two.) This high frequency is reflected in the relatively fast rollover of each of bits 234[0] to 234[4] of saturation counter 234 shortly after enable signal 216 goes high. Most notable, however, is the fact that most significant bit 234[4] goes from low to high before the trailing edge 302 of a corresponding clock cycle 304A of clock signal 240. Thus, saturation counter 234 has saturated, as indicated by counter status signal 244 going high, and seed value 225 needs to be decremented to slow output clock signal 228. This decrementing of seed value 225 is reflected in the incrementing of bit signal 262[0] of output 262 by seed value counter 258 (recall that the seed value counter is an incrementing counter, the output of which, i.e., output 262, is inverted by inverting circuitry 260.)

As clock multiplier 200 cycles through the feedback loop, it is seen in the next five clock cycles 304B-F of clock signal 240 that saturation counter 234 saturates (counter status signal 244 again goes high) prior to the end of each of these cycles. Each time, seed value 225 is decremented by one (the values of bit signals 262[0] to 262[2] increment). However, on the seventh cycle 304G of clock signal 240 after enable signal 216 went high, the frequency of output clock signal has slowed such that saturation counter 234 does not saturate within single cycle 304G, as indicated by most significant bit 234[4] not changing from low to high during cycle 304G. Consequently, comparator 248 generates a binary control signal 252 that causes lock latch 256 to activate, which it does on the rising edge of the next successive clock cycle 304H. This causes AND gate 230 to pass output clock signal 228 to become gated output clock signal 232. Clock multiplier 200 is now stable and may continue to output gated output clock signal 232 until the multiplier is disabled.

An exemplary embodiment has been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A clock multiplier structure, comprising:
a clock signal generator for generating an output clock signal having a plurality of first oscillation cycles, said clock signal generator including:
a ring oscillator for generating an oscillator signal having a first frequency and a plurality of second oscillation cycles;
a rollover counter in electrical communication with said ring oscillator for counting ones of said plurality of second oscillation cycles of said ring oscillator from a seed value to a terminal value and outputting a pulse each time said rollover counter reaches said first terminal value;
a saturation counter in electrical communication with said clock signal generator for counting ones of said plurality of second oscillation cycles from a multiplier start value to a saturation value and outputting a binary signal indicating whether or not said saturation counter has reached said saturation value, said saturation counter for receiving an input clock signal and configured to reset as a function of said input clock signal; and
a seed value generator in electrical communication with said saturation counter, said seed value generator for generating said seed value when said binary signal indicates that said saturation has not reached said saturation value, said seed value generator in electrical communication with said rollover counter for providing said seed value to said rollover generator.

2. The clock multiplier of claim 1, further comprising a frequency divider electrically coupled between said rollover counter and said saturation counter, said frequency divider outputting said output clock signal as a function of multiple ones of said pulse output by said rollover counter.

3. The clock multiplier of claim 2, wherein said frequency divider is a latch.

4. The clock multiplier of claim 1, wherein said seed value generator includes a seed value counter for changing said seed value as a function of said binary signal.

5. The clock multiplier of claim 4, wherein said seed value generator decrements said seed value in response to said binary signal.

6. The clock multiplier of claim 5, wherein said seed value counter is an incrementing counter.

7. The clock multiplier of claim 4, further comprising a comparator for comparing said binary value to a desired value and causing said seed value counter to change said seed value.

8. The clock multiplier of claim 1, wherein said clock signal generator includes a delay selector for allowing a user to select an amount of delay in said oscillator signal.

9. The clock multiplier of claim 1, further comprising a multiplier setter for allowing a user to vary said multiplier start value.

10. An integrated circuit, comprising:
functional circuitry;
a clock multiplier in electrical communication with said functional circuitry so as to provide a first clock signal having a plurality of first oscillation cycles to said functional circuitry, said clock multiplier including:
a clock signal generator for generating said first clock signal and including:
a ring oscillator for generating an oscillator signal having a first frequency and a plurality of second oscillator cycles;
a rollover counter in electrical communication with said ring oscillator for counting ones of said plurality of second oscillation cycles of said ring oscillator from a seed value to a terminal value and outputting a pulse each time said rollover counter reaches said first terminal value;
a saturation counter in electrical communication with said clock signal generator for counting ones of said plurality of second oscillation cycles from a multiplier start value to a saturation value and outputting a binary signal indicating whether or not said saturation counter has reached said saturation value, said saturation counter having a clock input for receiving a second clock signal and configured to reset as a function of said second clock signal; and
a seed value generator in electrical communication with said saturation counter, said seed value generator for generating said seed value when said binary signal indicates that said saturation has not reached said saturation value, said seed value generator in electrical communication with said rollover counter for providing said seed value to said rollover generator.

11. The integrated circuit of claim 10, further comprising a test clock input in electrical communication with said clock input of said saturation counter, said test clock input for receiving a test clock signal for use as said second clock signal.

12. The integrated circuit of claim 10, wherein said functional circuitry comprises dynamic random access memory and said first clock signal is for refreshing said dynamic random access memory.

13. The clock multiplier of claim 10, further comprising a frequency divider electrically coupled between said rollover counter and said saturation counter, said frequency divider outputting said output clock signal as a function of multiple ones of said pulse output by said rollover counter.

14. The clock multiplier of claim 13, wherein said frequency divider is a latch.

15. The clock multiplier of claim 10, wherein said seed value generator includes a seed value counter for changing said seed value as a function of said binary signal.

16. The clock multiplier of claim 15, wherein said seed value generator decrements said seed value in response to said binary signal.

17. The clock multiplier of claim 16, wherein said seed value counter is an incrementing counter.

18. The clock multiplier of claim 15, further comprising a comparator for comparing said binary value to a desired value and causing said seed value counter to change said seed value.

* * * * *